(12) United States Patent
Iacomini

(10) Patent No.: US 9,109,843 B1
(45) Date of Patent: Aug. 18, 2015

(54) RADIATOR SYSTEMS

(75) Inventor: Christine Schroeder Iacomini, Tucson, AZ (US)

(73) Assignee: PARAGON SPACE DEVELOPMENT CORPORATION, Tucson, AZ (US)

( * ) Notice: Subject to any disclaimer, the term of this patent is extended or adjusted under 35 U.S.C. 154(b) by 1155 days.

(21) Appl. No.: 12/826,625

(22) Filed: Jun. 29, 2010

Related U.S. Application Data

(60) Provisional application No. 61/221,535, filed on Jun. 29, 2009.

(51) Int. Cl.
| | | |
|---|---|---|
| *F28D 15/06* | (2006.01) | |
| *F28D 15/02* | (2006.01) | |
| *F28D 15/00* | (2006.01) | |

(52) U.S. Cl.
CPC ............. *F28D 15/06* (2013.01); *F28D 15/00* (2013.01); *F28D 15/0266* (2013.01)

(58) Field of Classification Search
CPC ...... F28D 15/06; F28D 15/00; F28D 15/0266
USPC .......................... 165/272, 274, 287, 288, 295
See application file for complete search history.

(56) References Cited

U.S. PATENT DOCUMENTS

| | | | |
|---|---|---|---|
| 3,382,920 A | | 5/1968 | Esselman et al. |
| 3,563,309 A | * | 2/1971 | Basiulis .................. 165/274 |
| 3,621,906 A | * | 11/1971 | Leffert .................... 165/272 |
| 3,741,289 A | * | 6/1973 | Moore ..................... 165/272 |
| 4,470,450 A | * | 9/1984 | Bizzell et al. ........ 165/104.25 |
| 4,492,266 A | * | 1/1985 | Bizzell et al. ........ 165/104.26 |
| 4,917,173 A | * | 4/1990 | Brown et al. ............ 165/274 |
| 5,069,274 A | * | 12/1991 | Haslett et al. ........... 165/272 |
| 5,103,897 A | * | 4/1992 | Cullimore et al. ....... 165/274 |
| 5,137,079 A | * | 8/1992 | Anderson ................. 165/297 |
| 5,347,825 A | * | 9/1994 | Krist ......................... 62/179 |
| 5,904,292 A | * | 5/1999 | McIntosh ................... 236/37 |
| 6,508,303 B1 | * | 1/2003 | Naderer .................... 165/299 |
| 6,591,899 B1 | * | 7/2003 | Yee ...................... 165/104.26 |
| 7,028,768 B2 | | 4/2006 | Aler et al. |
| 7,404,911 B2 | | 7/2008 | Hafner et al. |
| 7,637,315 B2 | * | 12/2009 | Ichinose et al. ............ 165/295 |
| 2007/0267188 A1 | | 11/2007 | Di Stefano et al. |
| 2008/0314564 A1 | * | 12/2008 | Nagaseki et al. ...... 165/104.31 |

OTHER PUBLICATIONS

Paragon Space Development Corporation, Paragon Stagnating Radiator, May 2, 2009—retrieved via Wayback Machine at http://web.archive.org/web/20090502190924/http://www.paragonsdc.com/paragon_stagnating_radiator_09.php).*
Apollo Operations Handbook SM2A-03-BLOCK II-(1) dated Apr. 15, 1969.*

* cited by examiner

*Primary Examiner* — Ljiljana Ciric
(74) *Attorney, Agent, or Firm* — Weaver Austin Villeneuve & Sampson LLP

(57) ABSTRACT

Radiator systems utilizing controlling features for shutdown and restart for varying heat load applications.

22 Claims, 6 Drawing Sheets

RADIATOR SYSTEMS

CROSS-REFERENCE TO RELATED APPLICATION

The present application is related to and claims priority from prior provisional application Ser. No. 61/221,535, filed Jun. 29, 2009, entitled "RADIATOR SYSTEMS", the contents of which are incorporated herein by this reference and are not admitted to be prior art with respect to the present invention by the mention in this cross-reference section.

STATEMENT REGARDING FEDERALLY SPONSORED RESEARCH OR DEVELOPMENT

Some embodiments of this invention may have been developed with United States Government support under NNJO8JA51C awarded by The National Aeronautics and Space Administration. The Government may have certain rights in the invention.

BACKGROUND

This invention relates to providing a system for improved radiators. More particularly this invention relates to providing a system for controlled partial shutdown and restart of radiator systems in extreme-cold environments. In extreme-cold environments thermal control is necessary for the function of electronics as well as life-support systems, particularly for manned space flight. However, radiator systems used for this thermal control may encounter stagnation of a thermal transfer fluid, and potential freezing, when thermal-emission-needs drop low due to shutdown of some waste-heat-generating subsystems.

When a radiator system does not have sufficient heat entering the system, eventually the thermal fluid cools to a point where stagnation occurs, which can prevent fluid flow through a part or all of the radiator system. Once full stagnation occurs, it becomes difficult to recover normal operation of the radiator system when the waste heat generated increases from the startup of additional waste-heat-generating systems. Further, should stagnation of thermal fluid remain too long, freezing may occur, potentially causing damage to the radiator system.

For the reasons above radiator system designs, for use in extreme-cold environments, have paid particular attention to preventing the stagnation of the thermal fluid by either designing the radiator system to handle a specific heat load (not allowing variation) or using a fluid with a low freezing temperature. However, this is problematic when thermal emission needs vary dramatically within an overall system having multiple uses with multiple configurations of waste-heat-generating subsystems, since in one configuration the waste heat generated may be minimal and in a second configuration the waste heat generated may be substantially larger. Further, thermal fluids having low freezing temperatures comprise toxic and/or flammable substances which are dangerous to use in manned environments. A radiator system is needed which can vary the heat transported in a controlled manner, thereby avoiding the risks currently associated with stagnation of the thermal fluid, and which uses thermal fluids safe for use within manned environments.

OBJECTS AND FEATURES OF THE INVENTION

A primary object and feature of the present invention is to provide a radiator system overcoming the above-mentioned problem.

It is a further object and feature of the present invention to provide such a radiator system controlling heat transfer by way of flow rate of thermal fluid.

Another object and feature of the present invention is to provide such a radiator system using the viscosity of a thermal fluid to controllably shut down portions of a radiator.

Yet another object and feature of the present invention is to provide such a radiator system, which when a portion of a radiator is "shutdown" maintains a small amount of fluid flow to allow "restarting" of the portion of the radiator.

A further object and feature of the present invention is to provide such a radiator system using a single loop system.

Another object and feature of the present invention is to provide such a radiator system using a thermal fluid which is standards compliant for use in a human life-support environment.

A further primary object and feature of the present invention is to provide such a system that is efficient, inexpensive, and useful. Other objects and features of this invention will become apparent with reference to the following descriptions.

SUMMARY OF THE INVENTION

In accordance with a preferred embodiment hereof, this invention provides a radiator system, related to reducing heat emissions while maintaining at least one fluid flow path, comprising: at least one thermal loop structured and arranged to collect heat from at least one heat source and transport such collected heat; at least one heat radiator structured and arranged to radiate such collected heat transported by such at least one thermal loop; and at least one thermal connector structured and arranged to thermally connect such at least one thermal loop to such at least one heat radiator; wherein such at least one thermal loop comprises at least one thermal transport fluid structured and arranged to transport such collected heat; wherein such at least one thermal transport fluid comprises at least one organo-flourine; wherein, when such at least one thermal transport fluid becomes locally more viscous, the locally more viscous fluid becomes more thermally insulative, wherein at least one fluid flow path through such at least one thermal loop is maintained; and wherein thermal conduction from such at least one thermal loop is reduced as such at least one thermal transport fluid becomes locally more viscous.

Moreover, it provides such a radiator system wherein such at least one thermal loop further comprises at least one distributing thermal transfer tubing structured and arranged to distribute such at least one thermal loop across such at least one heat radiator to increase thermal transfer from such at least one thermal loop to such at least one heat radiator. Additionally, it provides such a radiator system further comprising at least one thermal fluid flow rate controller structured and arranged to control flow rate of such at least one thermal transport fluid through such at least one thermal loop. Also, it provides such a radiator system wherein viscosity of such at least one thermal transport fluid is inversely related to the flow rate of such at least one thermal transport fluid through such at least one thermal loop.

In addition, it provides such a radiator system wherein such at least one transport fluid changes viscosity in such at least one distributing thermal transfer tubing. And, it provides such a radiator system wherein such at least one thermal-fluid flow-rate controller adjusts the flow rate of such at least one thermal transport fluid to balance heat load, from such at least one heat source, with such radiating heat from such at least one heat radiator. Further, it provides such a radiator system wherein such at least one distributing thermal transfer tubing comprises at least two thermal transfer tubes comprising different lengths. Even further, it provides such a radiator system wherein such at least one thermal loop traverses through at least one human-life-supporting enclosed environment. Moreover, it provides such a radiator system wherein such thermal transport fluid means comprises at least one perfluoropolyether.

In accordance with another preferred embodiment hereof, this invention provides a radiator system, related to reducing heat emissions while maintaining at least one fluid flow path, comprising: at least one thermal loop structured and arranged to collect heat from at least one heat source and transport such collected heat; at least one heat radiator structured and arranged to radiate such collected heat transported by such at least one thermal loop; and at least one thermal connector structured and arranged to thermally connect such at least one thermal loop to such at least one heat radiator; wherein such at least one thermal loop further comprises at least one distributing thermal transfer tubing structured and arranged to distribute such at least one thermal loop across such at least one heat radiator to increase thermal transfer from such at least one thermal loop to such at least one heat radiator; wherein such at least one thermal loop comprises at least one thermal transport fluid structured and arranged to transport such collected heat; wherein such at least one thermal transport fluid changes viscosity in such at least one distributing thermal transfer tubing; and wherein viscosity of such at least one thermal transport fluid is related to flow rate of such at least one thermal transport fluid through such at least one thermal loop; and at least one thermal fluid flow rate controller structured and arranged to control flow rate of such at least one thermal transport fluid through such at least one thermal loop; wherein such at least one thermal-fluid flow-rate controller adjusts flow rate of such at least one thermal transport fluid to balance heat load, from such at least one heat source, with such radiating heat from such at least one heat radiator; wherein, when such at least one transport fluid becomes locally more viscous, the locally more viscous fluid becomes more thermally insulative, wherein at least one fluid flow path through such at least one thermal loop is maintained; and wherein thermal conduction from such at least one thermal loop is reduced as such at least one transport fluid becomes locally more viscous.

Additionally, it provides such a radiator system wherein such at least one thermal loop traverses through at least one human-life-supporting enclosed environment. Also, it provides such a radiator system wherein such at least one thermal transport fluid means comprises at least one organo-flourine. In addition, it provides such a radiator system wherein such at least one thermal transport fluid comprises perfluoropolyether.

In accordance with another preferred embodiment hereof, this invention provides a radiator system, related to reducing heat emissions while maintaining at least one fluid flow path, comprising: thermal loop means for collecting heat from at least one heat source and transporting such collected heat; heat radiator means for radiating of such collected heat transported by such thermal loop means; and thermal connector means for thermally connecting such thermal loop means to such heat radiator means; wherein such thermal loop means comprises thermal transport fluid means for transporting such collected heat; wherein such thermal transport fluid means comprises at least one organo-flourine; wherein, when such transport fluid means becomes locally more viscous, the locally more viscous fluid becomes more thermally insulative, wherein at least one fluid flow path through such thermal loop means is maintained; and wherein thermal conduction from such thermal loop means is reduced as such transport fluid means becomes locally more viscous.

In addition, it provides such a radiator system wherein such thermal loop means further comprises distributing thermal transfer means for distributing thermal loop means across such heat radiator means to increase thermal transfer from such thermal loop means to such heat radiator means. And, it provides such a radiator system further comprising thermal fluid flow rate controller means for controlling flow rate of such thermal transport fluid means through such thermal loop means. Further, it provides such a radiator system wherein viscosity of such transport fluid means is inversely related to flow rate of such thermal transport fluid means through such thermal loop means. Even further, it provides such a radiator system wherein such transport fluid means changes viscosity in such distributing thermal transfer means.

Moreover, it provides such a radiator system wherein such thermal-fluid flow-rate controller means adjusts flow rate of such thermal transport fluid means to balance heat load, from such at least one heat source, with such emitting radiation from such heat radiator means. Additionally, it provides such a radiator system wherein such thermal loop means traverses through at least one human-life-supporting enclosed environment. Also, it provides such a radiator system wherein such thermal transport fluid means comprises perfluoropolyether.

In accordance with another preferred embodiment hereof, this invention provides a radiator system, related to reducing heat emissions while maintaining at least one fluid flow path, comprising: thermal loop means for collecting heat from at least one heat source and transporting such collected heat; heat radiator means for radiating of such collected heat transported by such thermal loop means; and thermal connector means for thermally connecting such thermal loop means to such heat radiator means; wherein such thermal loop means comprises distributing thermal transfer tubing means for distributing thermal loop means across such heat radiator means to increase thermal transfer from such thermal loop means to such heat radiator means; wherein such thermal loop means comprises thermal transport fluid means for transporting such collected heat; wherein such transport fluid means changes viscosity in such distributing thermal transfer tubing means; wherein viscosity of such thermal transport fluid means is related to flow rate of such thermal transport fluid means through such thermal loop means; thermal fluid flow rate controller means for controlling flow rate of such thermal transport fluid means through such thermal loop means; wherein such thermal-fluid flow-rate controller means adjusts flow rate of such thermal transport fluid means to balance heat load, from such at least one heat source, with such radiating heat from such heat radiator means wherein, when such transport fluid means becomes locally more viscous, the locally more viscous fluid becomes more thermally insulative, wherein at least one fluid flow path through such thermal loop means is maintained; and wherein thermal conduction from such thermal loop means is reduced as such transport fluid means becomes locally more viscous.

In addition, it provides such a radiator system wherein such thermal loop means traverses through at least one human-life-supporting enclosed environment. And, it provides such a radiator system wherein such thermal transport fluid means comprises at least one organo-flourine. In addition, it provides such a radiator system wherein such thermal transport fluid means comprises perfluoropolyether. In accordance with another preferred embodiment hereof, this invention provides a system comprising each and every novel feature,

DETAILED DESCRIPTION OF THE BEST MODES AND PREFERRED EMBODIMENTS OF THE INVENTION

Figure 1:
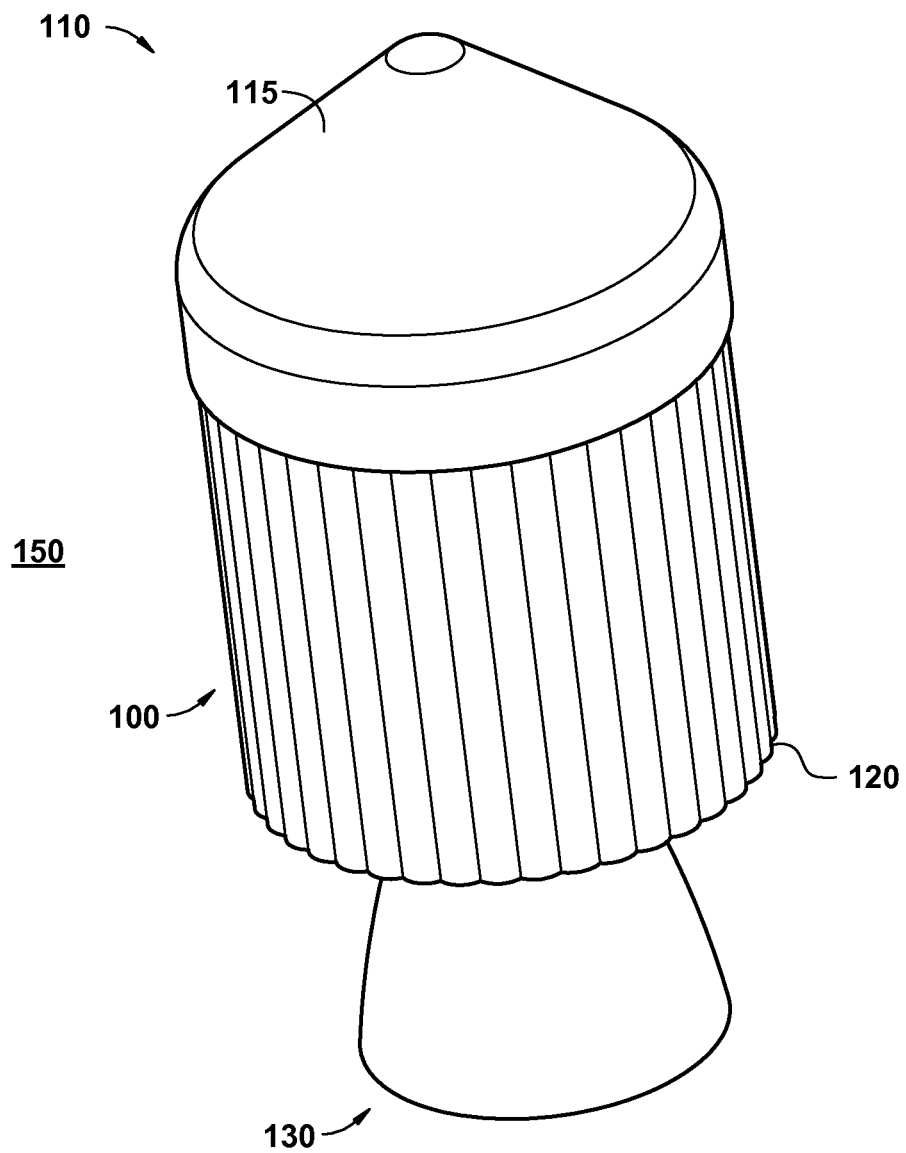
FIG. 1 shows a perspective view illustrating a manned spacecraft utilizing at least one radiator system according to a preferred embodiment of the present invention.

FIG. 1 shows a perspective view illustrating a manned spacecraft 110 utilizing at least one radiator system 100 according to a preferred embodiment of the present invention. Manned spacecraft 110 preferably comprises crew module 115, at least one propulsion module 130 and radiator system 100. Crew module 115 preferably comprises at least one human-life-supporting environment 210 (see FIG. 2). Propulsion module 130 preferably provides movement control to manned spacecraft 110. Manned spacecraft 110 preferably is used within at least one extreme-cold environment 150, preferably space.

Extreme-cold environment 150 comprises a temperature un-inhabitable by humans and thus requires the use of human-life-supporting environment 210. Human-life-supporting environment 210 preferably comprises an enclosed space with artificially-controlled atmospheric conditions hospitable to human life. Any exchange between human-life-supporting environment 210 and extreme-cold environment 150 is preferably controlled to maintain these conditions.

Figure 2:
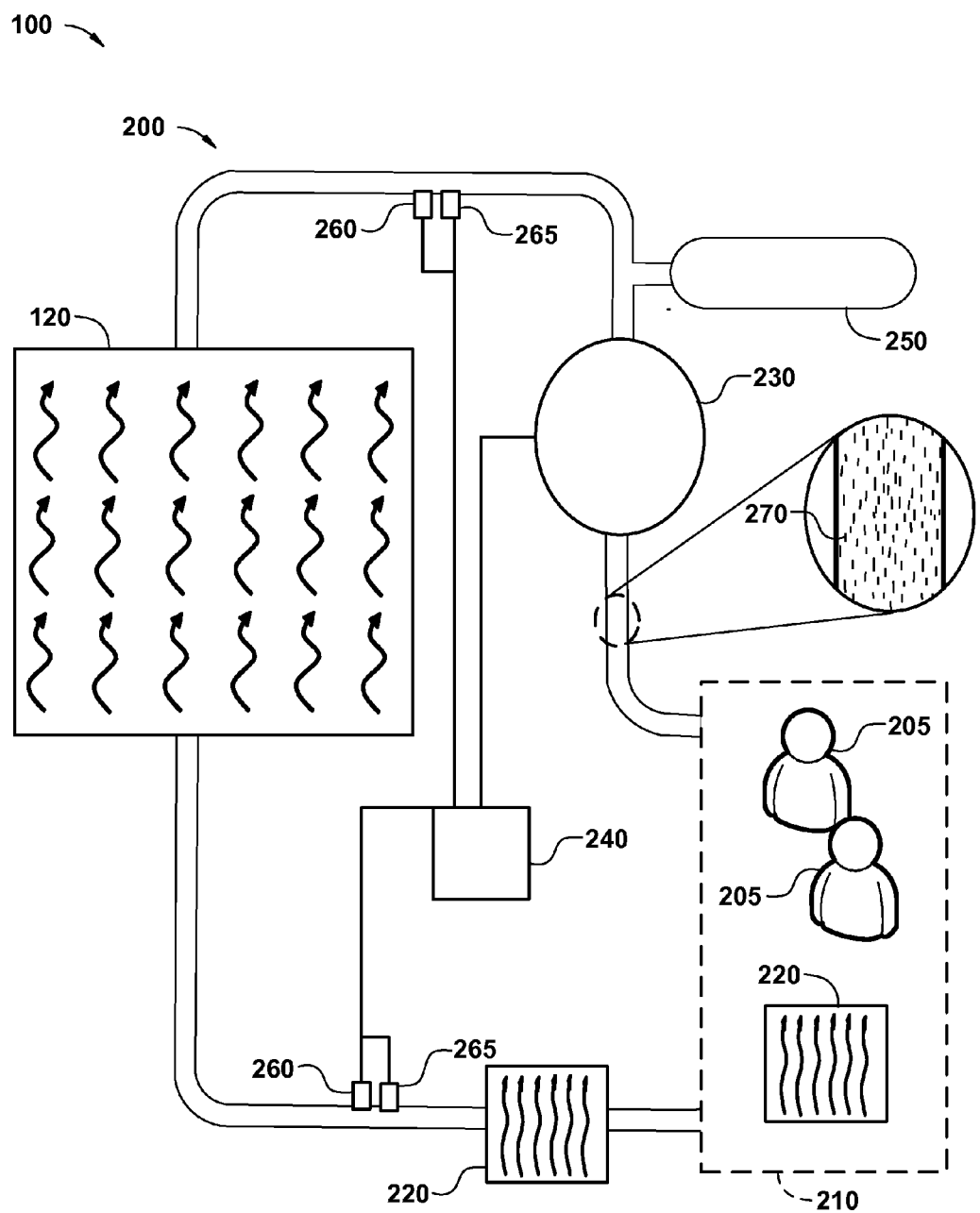
FIG. 2 shows a diagrammatic view illustrating a heat transfer loop of such at least one radiator system according to the preferred embodiment of FIG. 1.

Radiator system 100 preferably functions to regulate temperatures of manned spacecraft 110, particularly crew module 115, by transporting heat to at least one radiator 120 which preferably emits heat into extreme-cold environment 150. Manned spacecraft 110 preferably comprises multiple subsystems each of which are heat sources and are temperature sensitive. Heat must be transported away from such subsystems to maintain temperatures within operating ranges. Likewise, human-life-supporting environment 210 preferably utilizes temperature regulation to maintain a comfortable environment. Primarily, radiator system 100 preferably transports heat away from at least one waste-heat source 220, as shown in FIG. 2, to at least one radiator 120 to be radiated into extreme cold environment 150.

When manned spacecraft 110 operates with all subsystems running at full capacity, the heat load preferably is at maximum on radiator system 100. Should a spacecraft continuously need to operate only at or near this maximum heat load, a radiator system for the spacecraft only need be designed to transport a narrow range of heat and operate continuously at that level of heat transportation. However, when a spacecraft operates in multiple configurations, having differing subsystems operating simultaneously, the heat load may be anywhere from maximum (all subsystems running) to a minimum (all or nearly all subsystems in standby generating nearly no heat). Manned spacecraft 110 is preferably utilized with such a widely varying heat load, preferably over the course of an operational run, alternately preferably over the course of multiple operational runs. Further, radiator system 100 preferably operates at a wide range of heat transporting capacities to handle the varying heat loads of spacecraft 110.

Upon reading the teachings of this specification, those skilled in the art will now appreciate that, under appropriate circumstances, considering such issues as cost, future technologies, etc., other applications of radiator systems, such as, for example, lunar-type bases, non-terrestrial planetary colonies, space stations, etc., may suffice.

The dangers in operating a radiator system at widely varying heat loads, without a variable heat load capacity, present themselves in the two extremes of operation. If a radiator system is designed for high heat loads, when it operates at low heat loads, it transports too much heat and the subsystems of the spacecraft become too cold resulting in condensation and subsystem failures. Further, if this high-heat-load radiator system operates at too low of a temperature the thermal fluid within the radiator may freeze causing radiator failure and thereby heat transport problems when the heat load rises again.

If a radiator system is designed for lower heat loads, when it operates at high heat loads, it is not capable of transporting enough heat and the subsystems of the spacecraft become overheated and fail. Likewise, personnel in this spacecraft will experience overheating which leads to multiple biological, mental, and other problems.

FIG. 2 shows a diagrammatic view illustrating a heat transfer loop 200 of radiator system 100 according to the preferred embodiment of FIG. 1. To increase the weight efficiency of radiator system 100, radiator system 100 preferably comprises at least one single-loop radiator system comprising heat transfer loop 200 (at least embodying herein at least one thermal loop structured and arranged to collect heat from at least one heat source and transport such collected heat; and at least embodying herein thermal loop means for collecting heat from at least one heat source and transporting such collected heat).

Single-loop radiator systems provide many advantages, as well as some disadvantages over multi-loop systems. One advantage is the simplification of operations, having fewer components (which may need redundancy to handle failures) such as fluid pumps as well as having no loop-to-loop heat exchanges to decrease efficiency. Tied to this advantage of simplicity, a second advantage is in weight savings, having fewer components also means less weight to provide the functionality required. However, in single loop radiator systems one major drawback occurs: for safety reasons, the thermal fluids that may be used are very limited.

Heat transfer loop 200 comprises at least one thermal fluid 270, preferably at least one organo-flourine, preferably at least one perfluoropolyether, preferably Galden® HT170 manufactured by Solvay Solexis of Milan, Italy (www.solvaysolexis.com). Properties of Galden® HT170 are provided in Table A. Thermal fluid 270 preferably comprises an inert fluid, preferably for compatibility with light materials such as aluminum and plastic. Thermal fluid 270 preferably comprises at least one dielectric. Thermal fluid 270 preferably is non-toxic and preferably non-flammable. Thermal fluid 270 preferably fulfills safety standards for toxicity and preferably also for flammability for use in an enclosed environment for human habitation. For illustrative purposes, a magnified and transparent cutout of a portion of heat transport loop 200 has been provided in FIG. 2 showing thermal fluid 270 (at least embodying herein wherein such at least one thermal loop comprises at least one thermal transport fluid structured and arranged to transport such collected heat; and at least herein embodying wherein such thermal loop means comprises thermal transport fluid means for transporting such collected heat) within heat transport loop 200. Further discussion of particular functions and state changes of thermal fluid 270 in radiator system 100 during operation are provided in FIGS. 4, 5 and 6.

Heat transfer loop 200 preferably comprises aluminum for additional weight efficiency. Upon reading the teachings of this specification, those skilled in the art will now appreciate that, under appropriate circumstances, considering such issues as cost, future applications, available materials, etc., other materials, such as, for example, plastics, stainless steel, cermets, etc., may suffice.

Heat transfer loop 200 preferably comprises at least one fluid pump 230, and preferably at least one expansion tank 250. Fluid pump 230 preferably circulates thermal fluid 270 throughout heat transfer loop 200. Fluid pump 230 preferably is capable of variable flow rates of thermal fluid 270. Expansion tank 250 preferably allows heat transfer loop 200 to store extra volume of thermal fluid 270 when thermal fluid 270 expands from temperature increase, and to supply extra volume of thermal fluid 270 when thermal fluid 270 contracts from temperature decrease.

Radiator system 100 preferably further comprises at least one fluid-flow control subsystem 240. Fluid-flow control subsystem 240 (at least embodying herein at least one thermal fluid flow rate controller structured and arranged to control flow rate of such at least one thermal transport fluid through such at least one thermal loop; and at least embodying herein thermal fluid flow rate controller means for controlling flow rate of such thermal transport fluid means through such thermal loop means) preferably utilizes at least one temperature sensor 260 and preferably at least one mass-flow rate sensor 265. Fluid-flow control subsystem 240 preferably controls fluid pump 230 and adjusts the rate of flow of thermal fluid 270. By reading the temperature (from temperature sensor 260) within heat transport loop 200 and by reading the current mass-flow rate (from mass-flow rate sensor 265) of thermal fluid 270, fluid-flow control subsystem 240 preferably adjusts fluid pump 230 to adjust the heat transport through heat transport loop 200.

TABLE A

| Galden ® HT170 | | |
| --- | --- | --- |
| Chemical structure: | $CF_3$—$(OCFCF_2)_n$—$(OCF_2)_m$—$OCF_3$<br>$\vert$<br>$CF_3$ | |
| Operating temperature range | −30° C. to 160° C. | |
| Normal Boiling Point | 170° C. | |
| Pour Point | | −97° C. |
| Kinematic Viscosity | @ −30° C. | 11.6 cSt |
| | @ 25° C. | 1.8 cSt |
| Density | @ −30° C. | 1.90 g/cm$^3$ |
| | @ 25° C. | 1.77 g/cm$^3$ |
| Surface Tension | @ 25° C. | 18 Dyne/cm |
| Vapor Pressure | @ 25° C. | 0.8 Torr |
| Specific Heat | @ −30° C. | 0.193 cal/g ° C. |
| | @ 25° C. | 0.232 cal/g ° C. |
| Heat of Vaporization at Boiling Point | | 16 cal/g |
| Thermal Conductivity | @ −30° C. | 0.070 W/m K |
| | @ 25° C. | 0.065 W/m K |
| Dielectric Strength | @ 25° C. | 40 kV – 2.54 mm gap |
| Dielectric Constant | @ 25° C. | 1.94 |
| Volume Resistivity | @ 25° C. | $1.5 \times 10^{15}$ Ohm-cm |
| Solubility of Water | | 14 mg/Kg |
| Solubility of Air | | 26 ml gas/100 ml liq |
| Flash Point | | None |
| Molecular Weight | | 760 amu |

Heat transport loop 200 preferably collects heat from waste-heat source 220 and transports the collected heat to radiator 120. Heat transfer loop 200 preferably circulates through human-life-supporting environment 210 (at least herein embodying wherein such at least one thermal loop traverses through at least one human-life-supporting enclosed environment; and at least herein embodying wherein such thermal loop means traverses through at least one human-life-supporting enclosed environment), as shown. For safety to personnel 205 in human-life-supporting environment 210, thermal fluid 270 preferably fulfills safety standards for toxicity and preferably also for flammability for use in an enclosed environment for human habitation.

Figure 3:
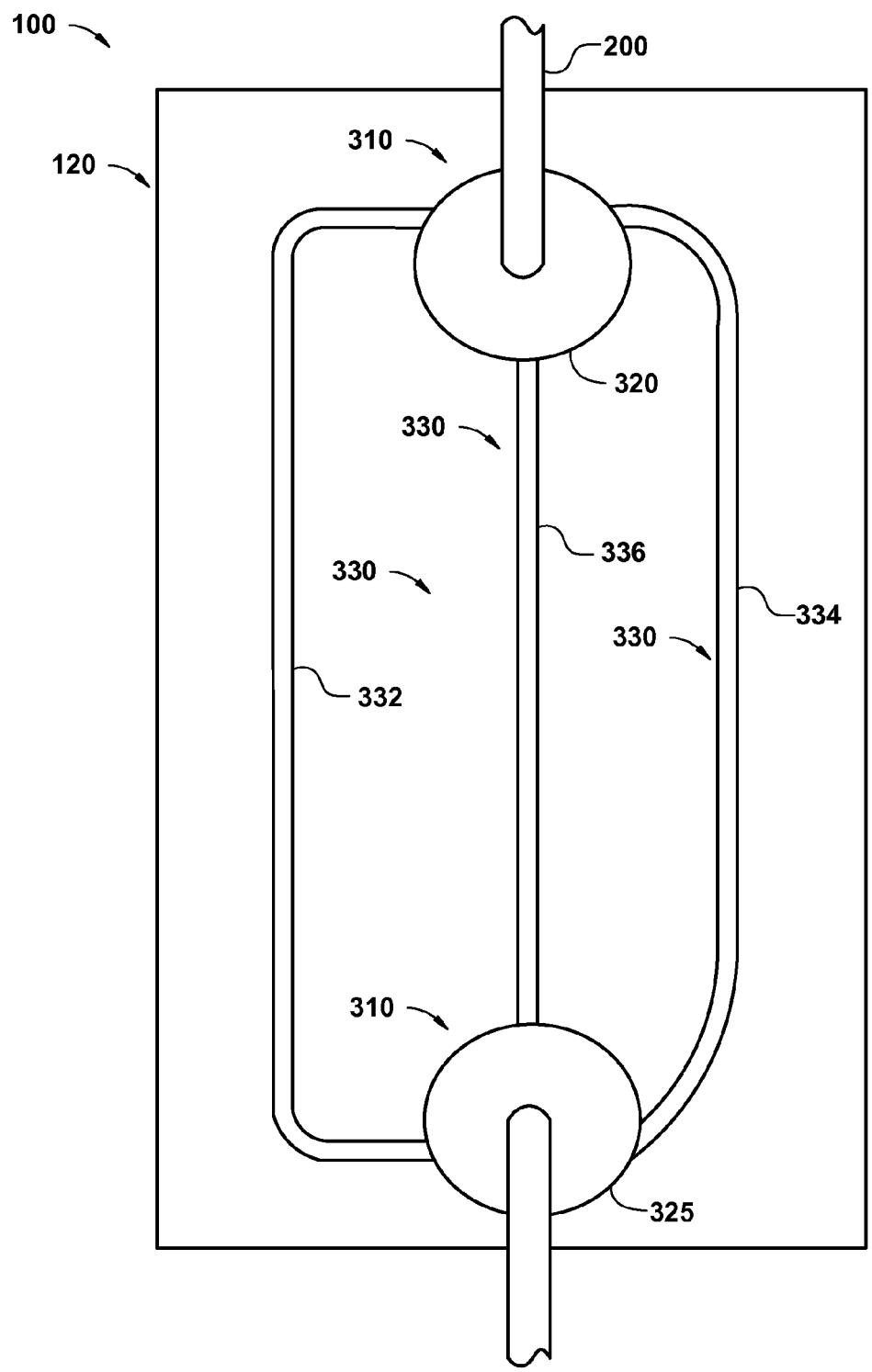
FIG. 3 shows a diagrammatic view illustrating at least one radiator according to the preferred embodiment of FIG. 2.

FIG. 3 shows a diagrammatic view illustrating radiator 120 according to the preferred embodiment of FIG. 2. Radiator 120 preferably comprises at least two manifolds 310, preferably at least one intake manifold 320 and at least one outlet manifold 325. As part of circulation through heat transport loop 200, thermal fluid 270 preferably flows into intake manifold 320, is preferably distributed into at least two thermal transfer tubes 330, and into outlet manifold 325.

Manifolds 310 preferably comprise equal pressure distribution across each thermal transfer tube 330. Manifolds 310 are preferably cylindrical and thermal transfer tubes 330 are preferably spaced evenly around the perimeter of manifolds 310 to distribute pressure evenly between thermal transfer tubes 330. Upon reading the teachings of this specification, those skilled in the art will now appreciate that, under appropriate circumstances, considering such issues as cost, future technologies, application parameters, etc., other pressure equalized manifolds, such as, for example, pressure compensated manifolds, branched manifolds, spherical manifolds, etc., may suffice.

Thermal transfer tubes 330 preferably provide a conduit for thermal fluid 270 where heat is transferred from thermal fluid 270 to be handled by radiator 120. Thermal transfer tube 330 preferably is thermally connected to radiator 120 (see FIG. 4). Thermal transfer tubes 330 (at least herein embodying wherein such at least one thermal loop further comprises at least one distributing thermal transfer tubing structured and arranged to distribute such at least one thermal loop across such at least one heat radiator to increase thermal transfer from such at least one thermal loop to such at least one heat radiator; and at least embodying herein wherein such thermal loop means further comprises distributing thermal transfer means for distributing thermal loop means across such heat radiator means to increase thermal transfer from such thermal loop means to such heat radiator means) are preferably distributed across radiator 120, preferably spaced evenly, preferably to allow efficient heat transfer from thermal fluid 270 to radiator 120.

Thermal transfer tube 330 preferably comprises a diameter of about ¼ inch. Upon reading the teachings of this specification, those skilled in the art will now appreciate that, under appropriate circumstances, considering such issues as cost, future technologies, application parameters, etc., other diameters, such as, for example, ⅛ inch, ⅜ inch, etc., may suffice.

Thermal transfer tube 330 preferably comprises aluminum. Upon reading the teachings of this specification, those skilled in the art will now appreciate that, under appropriate circumstances, considering such issues as cost, future technologies, etc., other materials, such as, for example, stainless steel, plastics, cermets, etc., may suffice.

Thermal transfer tubes 330 preferably comprise different lengths on radiator 120, shown as long tube 332, medium tube 334, and short tube 336 (at least herein embodying wherein such at least one distributing thermal transfer tubing comprises at least two thermal transfer tubes comprising different lengths). The length of thermal transfer tube 330 corresponds with the length of time heat transfer can occur from thermal fluid to radiator 120. The total heat transferred from a portion of thermal fluid 270 as this portion travels through long tube 332 is greater than the total heat transferred from a similar portion of thermal fluid 270 in medium tube 334, which in turn is greater than the total heat transferred from a similar portion of thermal fluid 270 in short tube 336. Therefore the temperature drop across long tube 332 is greater than the temperature drop across medium tube 334 which is greater than the temperature drop across short tube 336.

Figure 4:
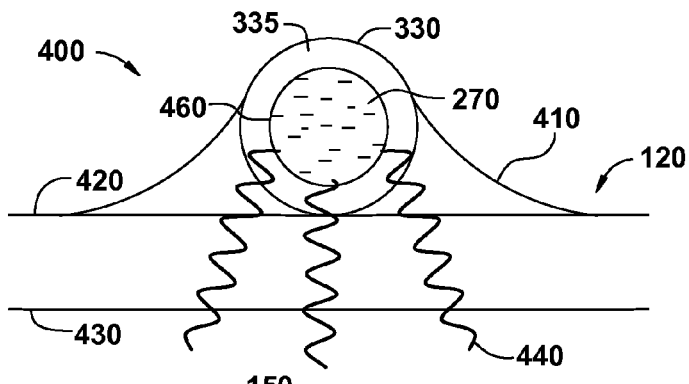
FIG. 4 shows a diagrammatic cross-sectional view of at least one heat transfer tube, illustrating maximum heat transfer under maximum flow of thermal fluid, according to the preferred embodiment of FIG. 2.
Figure 5:
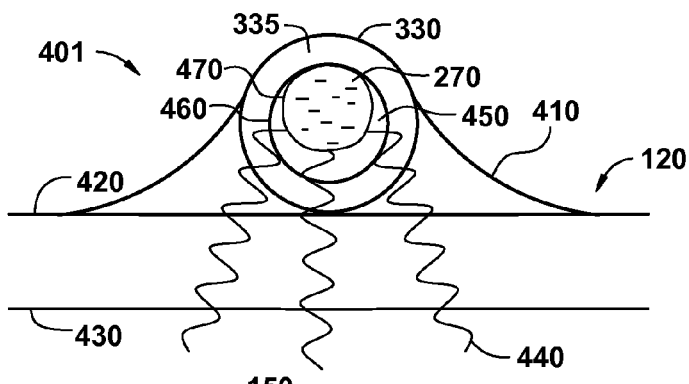
FIG. 5 shows a diagrammatic cross-sectional view of at least one heat transfer tube, illustrating medium heat transfer under medium flow of thermal fluid, according to the preferred embodiment of FIG. 2.
Figure 6:
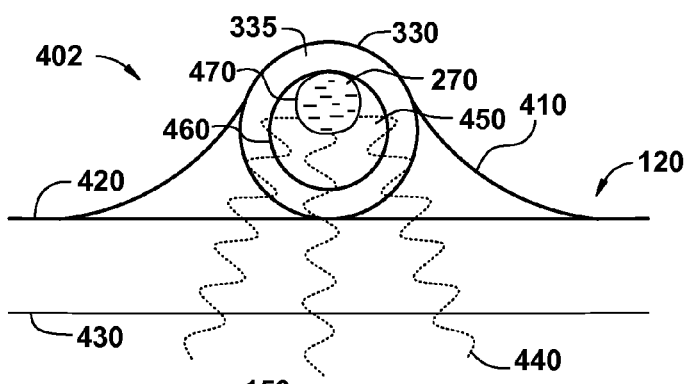
FIG. 6 shows a diagrammatic cross-sectional view of at least one heat transfer tube, illustrating minimum heat transfer under minimum flow of thermal fluid, according to the preferred embodiment of FIG. 2.

FIG. 4 shows a diagrammatic cross-sectional view of at heat transfer tube 330, illustrating maximum heat transfer 400 under maximum flow of thermal fluid 270, according to the preferred embodiment of FIG. 2. FIG. 5 shows a diagrammatic cross-sectional view of heat transfer tube 330, illustrating medium heat transfer 401 under medium flow of thermal fluid 270, according to the preferred embodiment of FIG. 2. FIG. 6 shows a diagrammatic cross-sectional view of heat transfer tube 330, illustrating minimum heat transfer 402 under minimum flow of thermal fluid 270, according to the preferred embodiment of FIG. 2.

Thermal transfer tube 330 is preferably thermally connected to interior surface 420 of radiator 120 (at least embodying herein at least one heat radiator structured and arranged to radiate such collected heat transported by such at least one thermal loop; and at least embodying herein heat radiator means for radiating of such collected heat transported by such thermal loop means), preferably with at least one thermal connector 410 (at least embodying herein at least one thermal connector structured and arranged to thermally connect such at least one thermal loop to such at least one heat radiator; and at least embodying herein thermal connector means for thermally connecting such thermal loop means to such heat radiator means), preferably at least one thermally conductive epoxy, preferably at least one aluminum based thermally conductive epoxy, preferably "Durlaco 132" (available commercially from Cotronics Corp. in Brooklyn, N.Y.). Upon reading the teachings of this specification, those skilled in the art will now appreciate that, under appropriate circumstances, considering such issues as cost, future technologies, etc., other thermal connectors, such as, for example, welds, other metallic epoxies, material fusion, etc., may suffice.

In FIGS. 4, 5 and 6, at least one thermal energy transfer 440 preferably passes from thermal fluid 270, preferably through wall 335 of thermal transfer tube 330, preferably through thermal connector 410 to radiator 120 for emission into extreme-cold environment 150 from radiator skin 430 of radiator 120, as shown.

At full flow of thermal fluid 270, as shown in FIG. 4, thermal fluid 270 is in direct contact with interior of thermal transfer tube 330. Thermal energy transfers from thermal fluid 270 to wall 335 of thermal transfer tube 330 at an interfacing surface 460 and through wall 335. From wall 335 the thermal energy then transfers through thermal connector 410 to radiator skin 430 to be radiated into extreme-cold environment 150.

In a simplified ideal form, the heat transfer generally follows as $H=-kA(\Delta T/L)$ where k is a constant based on material, A is the interface surface area, $\Delta T$ is the difference in temperature and L is the thickness of the material through which the heat transfer occurs. At a steady state a temperature gradient occurs with a "cold" side and a "hot" side to the material where the transfer occurs from the "hot" side to the "cold" side. Theoretical models show that, in effect, thermal fluid 270 is continuously refreshed and will maintain a constant temperature profile and thus a constant temperature at interfacing surface 460. In addition, interfacing surface 460 is preferably maximized in area thus maximizing thermal energy transfer 440. A thermal steady state is achieved between thermal fluid 270 and extreme-cold environment 150 with temperature gradients (according to each material present) between interfacing surface 460 and radiator skin 430 exposed to extreme-cold environment 150. With interfacing surface 460 maximized, a maximum amount of thermal energy transfer preferably occurs between thermal fluid 270 and wall 335.

When the flow of thermal fluid 270 is diminished, the thermal energy transfer preferably changes. Initially as the flow of thermal fluid 270 diminishes, the thermal energy transfer between thermal fluid 270 and wall 335 remains the same, however the temperature profile begins changing since thermal fluid 270 is not refreshed as quickly. In effect, more thermal energy is leaving thermal fluid 270 locally than is being input due to the flow. As the temperature profile changes, portions of thermal fluid 270 closest to the greatest thermal energy transfer along interfacing surface 460 (those points along the surface with the least thickness to extreme-cold environment 150) begin to increase in viscosity until those portions stagnate, forming at least one layer of stagnate fluid 450.

Figure 7:
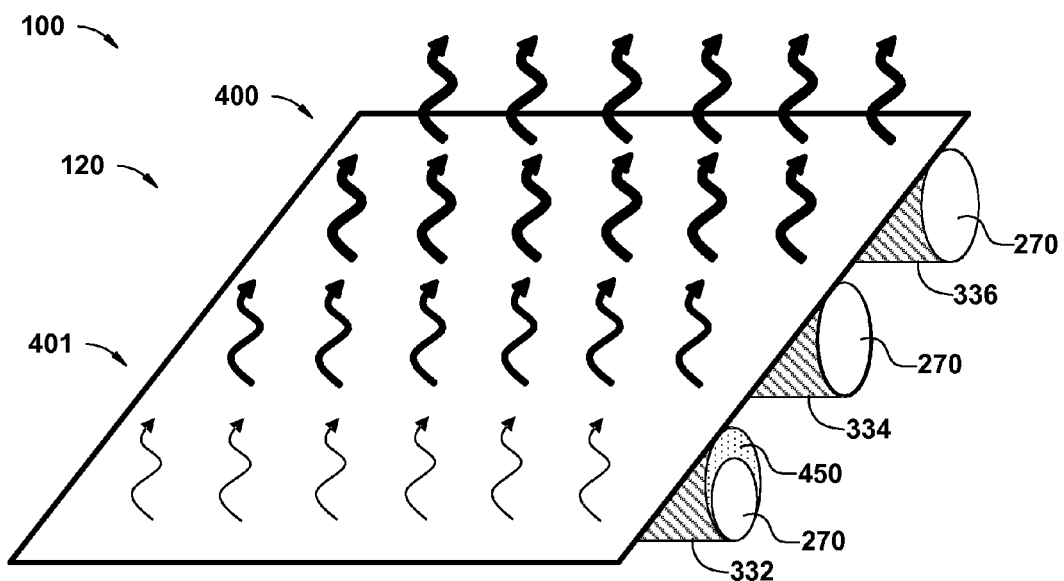
FIG. 7 and FIG. 8 show a diagrammatic perspective cut-away view of at least one radiator, illustrating progressive stagnation of thermal fluid, according to the preferred embodiment of FIG. 2.

Consequently as the flow of thermal fluid 270 is diminished, the viscosity of stagnate fluid 450 increases to the point at which stagnate fluid 450 adheres to wall 335 (this arrangement at least herein embodying wherein viscosity of such at least one thermal transport fluid is inversely related to the flow rate of such at least one thermal transport fluid through such at least one thermal loop; and this arrangement at least herein embodying wherein viscosity of such transport fluid means is inversely related to flow rate of such thermal transport fluid means through such thermal loop means). Stagnate fluid 450 effectively stops moving with thermal fluid 270 and adds to wall 335 through which thermal energy transfer 440 takes place. Because of stagnate fluid 450, interface surface 460 becomes the interface between two static materials and in models becomes merely a change in the constant k for purposes of determining the steady state temperature gradients. The interface between the portions of thermal fluid 270 that are constantly refreshing and stagnate fluid 450 (fluid interface 470) becomes the limiting surface area of thermal energy transfer 440. In effect, stagnate fluid 450 preferably acts as an insulator, slowing down thermal energy transfer 440, as shown in FIG. 6 and FIG. 7. This arrangement at least herein embodies wherein, when such at least one thermal transport fluid becomes locally more viscous, the locally more viscous fluid becomes more thermally insulative, wherein at least one fluid flow path through such at least one thermal loop is maintained; and this arrangement at least herein embodies wherein, when such transport fluid means becomes locally more viscous, the locally more viscous fluid becomes more thermally insulative, wherein at least one fluid flow path through such thermal loop means is maintained; and this arrangement at least herein embodies wherein thermal conduction from such at least one thermal loop is reduced as such at least one transport fluid becomes locally more viscous.

In addition, stagnate fluid 450 also preferably constricts the effective interior diameter through which thermal fluid 270 may flow, as shown in FIG. 6 and FIG. 7. While this constriction does not change the overall flow rate of thermal fluid 270, it does alter the local rate of change or "refreshing" of thermal fluid 270. A steady state will occur when the thermal energy input from fluid flow of thermal fluid 270 matches the thermal energy transfer through stagnate fluid 450 to wall 335 (based on the local rate of change from constriction and the surface area of fluid interface 470). This arrangement at least herein embodies wherein thermal conduction from such at least one thermal loop is reduced as such at least one thermal transport fluid becomes locally more viscous; and this arrangement at least herein embodies wherein such at least one transport fluid changes viscosity in such at least one distributing thermal transfer tubing; and this arrangement at least herein embodies wherein such transport fluid means changes viscosity in such distributing thermal transfer means.

While the simplified static-type thermal-energy-transfer theory outlined above generally explains the dynamics of stagnation within thermal fluid 270, the real world dynamics of fluid interface 470 complicates true modeling. Since thermal fluid 270 is operating with a temperature profile having temperatures which affect the viscosity (see FIG. 9) of thermal fluid 270, a viscosity gradient is present. This viscosity gradient allows portions of thermal fluid 270 to flow at different rates causing differing rates of "refreshing". Therefore for complete modeling, a complicated dynamic model must be used, preferably taking into account the varying flow rates (from the viscosity gradient) inputting energy and thermal transfer through thermal fluid 270 itself. However, for the purposes of conceptually understanding the operation of radiator system 100 the simplified static-type theory suffices.

When the flow of thermal fluid 270 reaches a minimum value, as shown in FIG. 6, thermal fluid 270 flows in a "trickle" through thermal transfer tube 330. This trickle flow will still transfer a small amount of thermal energy through to radiator 120 maintaining stagnate fluid 450 in an un-frozen state. In this trickle flow state (minimum heat transfer 402), thermal transfer tube 330 is essentially "powered down", preferably for low heat loads. While the mass flow rate is very small, it is preferable to maintain this trickle flow through thermal transfer tube 330 in order that stagnate fluid 450 may preferably be reclaimed and freezing preferably be prevented.

When the heat load generated in spacecraft 110 increases, the flow rate is preferably increased. As the flow rate increases, stagnate fluid 450 begins receiving more heat from thermal fluid 270 than it can transfer (over the available time frame) to wall 335, and thus preferably begins to increase in temperature. As the temperature of stagnate fluid 450 increases, the viscosity decreases and stagnate fluid preferably rejoins with thermal fluid 270, preferably flowing through heat transport loop 200.

By adjusting the flow rate of thermal fluid 270, applicant has found through experimentation that the heat transferred by heat transport loop 200 may preferably be altered from maximum heat transfer 400 to minimum heat transfer 402 and may preferably be maintained even at a point in between of medium heat transfer 401. Radiator system 100 preferably utilizes adjustments of flow rates, made by fluid-flow control subsystem 240, to match the heat transfer to the heat load within spacecraft 110 (this arrangement at least herein embodying wherein such at least one thermal-fluid flow-rate controller adjusts the flow rate of such at least one thermal transport fluid to balance heat load, from such at least one heat source, with such radiating heat from such at least one heat radiator; and this arrangement at least herein embodying wherein such thermal-fluid flow-rate controller means adjusts flow rate of such thermal transport fluid means to balance heat load, from such at least one heat source, with such emitting radiation from such heat radiator means). This arrangement at least herein embodies wherein viscosity of such at least one thermal transport fluid is controlled through the flow rate of such at least one thermal transport fluid through such at least one thermal loop.

Figure 8:
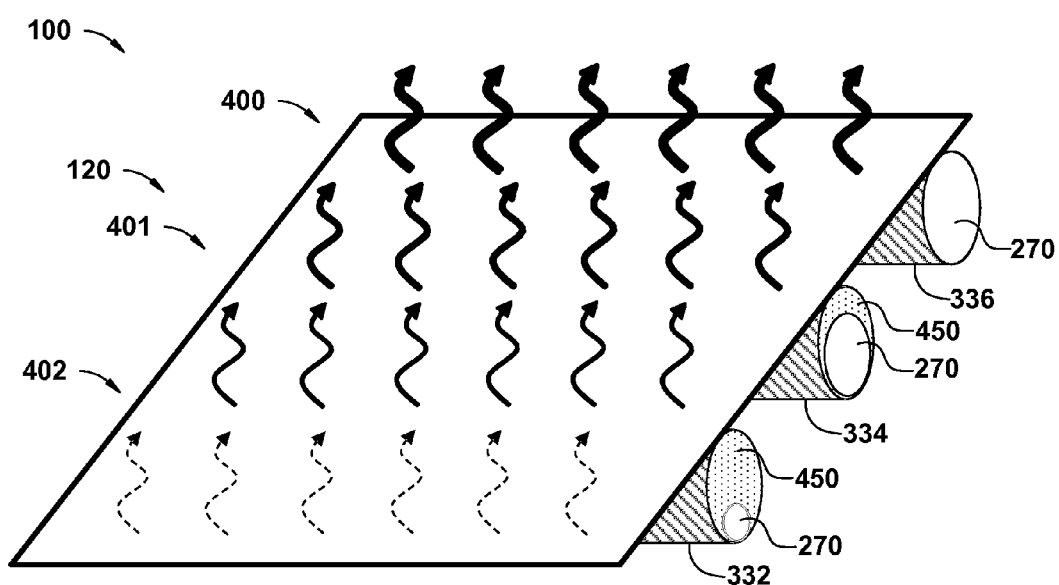

FIG. 7 and FIG. 8 show a diagrammatic perspective cutaway view of radiator 120, illustrating progressive stagnation of thermal fluid, according to the preferred embodiment of FIG. 2. By using short tube 336, medium tube 334 and long tube 332, stagnate fluid 450 forms at different flow rates in each thermal transfer tube 330.

In FIG. 7, long tube 332 is shown exhibiting medium heat transfer 401, while medium tube 334 and short tube 336 exhibit maximum heat transfer 400. With a reduction of flow rate, as shown in FIG. 8, long tube 332 exhibits minimum heat transfer 402, medium tube exhibits medium heat transfer 401 and short tube still remains at maximum heat transfer 400.

The difference in lengths of long tube 332, medium tube 334 and short tube 336 preferably determines the turn-down ratio of radiator system 100. A greater difference preferably gives less reduction in heat transfer before one of thermal transfer tubes 330 reaches minimum heat transfer 402, while a smaller difference preferably gives a greater reduction in heat transfer before one of thermal transfer tubes 330 reaches minimum heat transfer 402.

Upon reading the teachings of this specification, those skilled in the art will now appreciate that, under appropriate circumstances, considering such issues as cost, future technologies, etc., other thermal transfer tube arrangements, such as, for example, differing lengths on different radiators, consistent length on radiator, greater or fewer number of thermal transfer tubes in the thermal transport loop, etc., may suffice.

Upon reading the teachings of this specification, those skilled in the art will now appreciate that, under appropriate circumstances, considering such issues as cost, future technologies, application parameters, etc., other radiator arrangements for asymmetric stagnation, such as, for example, radiator positioning to be interacting with an environmental temperature gradient across the radiator skin, asymmetric pressure within manifolds creating variation in flow rates, variations in thermal transfer tube diameters, other methods of having differing flow rates through thermal transfer tubes, other methods having dissimilar heat rejection rates from thermal transfer tubes, etc., may suffice.

Figure 9:
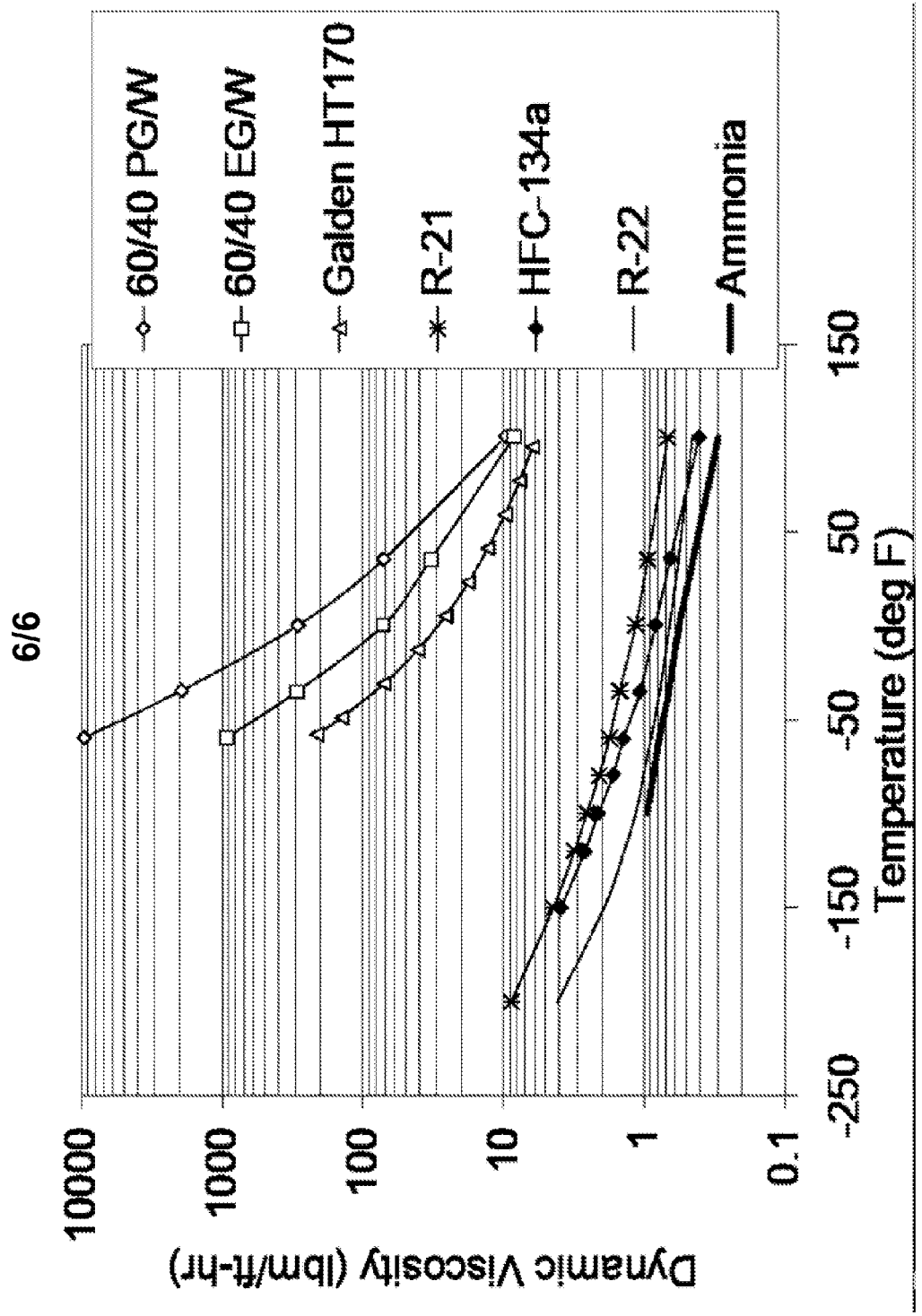
FIG. 9 shows a graph, illustrating viscosity versus temperature curves for various thermal fluids, according to the preferred embodiment of FIG. 2.

FIG. 9 shows a graph, illustrating viscosity versus temperature curves for various thermal fluids, according to the preferred embodiment of FIG. 2. Shown in FIG. 9, in particular are propylene glycol/water (PG/W), ethylene glycol/water (EG/W), and Galden® HT170. Applicant notes that Galden® HT170 lies well below the PG/W and EG/W lines preferably allowing for greater design flexibility, preferably mitigating implementation of fluid-flow control subsystem 240.

Although applicant has described applicant's preferred embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

What is claimed is:

1. A radiator system, related to reducing heat emissions while maintaining at least one fluid flow path, comprising:
    a) at least one thermal loop structured and arranged to collect heat from at least one heat source and transport such collected heat, the at least one thermal loop including a thermal transport fluid to transport such collected heat;
    b) at least one heat radiator structured and arranged to radiate, into an external environment, such collected heat transported by the at least one thermal loop;
    c) at least one thermal connector structured and arranged to thermally connect the at least one thermal loop to the at least one heat radiator; and
    d) a fluid flow control system configured to control a flow rate of the thermal transport fluid;
    e) wherein, when the thermal transport fluid decreases in temperature, the thermal transport fluid becomes locally more viscous proximate the thermal connection with the at least one thermal loop and the at least one heat radiator;
    f) wherein, when the thermal transport fluid becomes locally more viscous, the locally more viscous fluid becomes more thermally insulative and at least one fluid flow path through the at least one thermal loop is maintained based at least in part on the controlled flow rate of the thermal transport fluid; and
    g) wherein thermal conduction from the at least one thermal loop is reduced as the at least one thermal transport fluid becomes locally more viscous.

2. The radiator system according to claim 1 wherein the at least one thermal loop further comprises at least one distributing thermal transfer tubing structured and arranged to distribute the at least one thermal loop across the at least one heat radiator to increase thermal transfer from the at least one thermal loop to the at least one heat radiator.

3. The radiator system according to claim 1 wherein the fluid flow control system comprises a flow rate controller, wherein the flow rate controller is configured to reduce the flow rate of the thermal transport fluid in response to the decreased temperature of the thermal transport fluid.

4. The radiator system according to claim 1 wherein the viscosity of the thermal transport fluid is inversely related to the flow rate of the thermal transport fluid through said at least one thermal loop.

5. The radiator system according to claim 1 wherein at least some of the thermal transport fluid becomes stagnant proximate the thermal connection with the at least one thermal loop and the at least one heat radiator.

6. The radiator system according to claim 5 wherein the fluid flow control system adjusts the flow rate of the thermal transport fluid to maintain at least a minimum flow of the thermal transport fluid through the at least one fluid flow path when the at least some of the thermal transport fluid becomes stagnant.

7. The radiator system according to claim 1 wherein the at least one thermal loop comprises at least two thermal transfer tubes, the at least two thermal transfer tubes structured and arranged to distribute the at least one thermal loop across the at least one heat radiator to increase thermal transfer from the at least one thermal loop to the at least one heat radiator.

8. The radiator system according to claim 1 wherein the at least one thermal loop traverses through at least one human-life-supporting enclosed environment.

9. The radiator system according to claim 1 wherein the thermal transport fluid comprises at least one perfluoropolyether.

10. The radiator system according to claim 1 wherein the fluid flow control system comprises a fluid pump capable of adjusting the flow rate of the thermal transport fluid.

11. A radiator system, related to reducing heat emissions while maintaining at least one fluid flow path, comprising:
    a) at least one thermal loop structured and arranged to collect heat from at least one heat source and transport such collected heat, the at least one thermal loop including a thermal transport fluid to transport such collected heat;
    b) at least one heat radiator structured and arranged to radiate, into an external environment, such collected heat transported by the at least one thermal loop;
    c) at least one thermal connector structured and arranged to thermally connect the at least one thermal loop to the at least one heat radiator; and
    d) a fluid flow control system configured to control a flow rate of the thermal transport fluid;
    e) wherein the at least one thermal loop further comprises at least one distributing thermal transfer tubing structured and arranged to distribute the at least one thermal loop across said at least one heat radiator to increase thermal transfer from the at least one thermal loop to the at least one heat radiator;
    f) wherein the at least one thermal transport fluid changes viscosity in the at least one distributing thermal transfer tubing due to changes in heat load of such collected heat;
    g) wherein the viscosity of the thermal transport fluid is inversely related to the flow rate of the thermal transport fluid through the at least one thermal loop;
    h) wherein, when the thermal transport fluid decreases in temperature, the thermal transport fluid becomes locally more viscous proximate the thermal connection with the at least thermal loop and the at least one heat radiator;
    i) wherein, when the thermal transport fluid becomes locally more viscous, the locally more viscous fluid becomes more thermally insulative and at least one fluid flow path through said at least one thermal loop is maintained based at least in part on the controlled flow rate of the thermal transport fluid; and
    wherein thermal conduction from the at least one thermal loop is reduced as the at least one transport fluid becomes locally more viscous.

12. The radiator system according to claim 11 wherein the at least one thermal loop traverses through at least one human-life-supporting enclosed environment.

13. The radiator system according to claim 11 wherein the thermal transport fluid means comprises at least an organoflourine.

14. The radiator system according to claim 13 wherein the thermal transport fluid comprises perfluoropolyether.

15. A radiator system, related to reducing heat emissions while maintaining at least one fluid flow path, comprising:
    a) thermal loop means for collecting heat from at least one heat source and transporting such collected heat, the thermal loop means including a thermal transport fluid means to transport such collected heat;

b) heat radiator means for radiating such collected heat transported by the thermal loop means into an external environment;

c) thermal connector means for thermally connecting said thermal loop means to the heat radiator means;

d) fluid flow control means for controlling a flow rate of the thermal transport fluid means;

e) wherein, when the thermal transport fluid means decreases in temperature, the thermal transport fluid means becomes locally more viscous proximate the thermal connection with the thermal loop means and the heat radiator means;

f) wherein, when the transport fluid means becomes locally more viscous, the locally more viscous fluid becomes more thermally insulative, wherein at least one fluid flow path through the thermal loop means is maintained based at least in part on the controlled flow rate of the thermal transport fluid means; and g) wherein thermal conduction from the thermal loop means is reduced as the thermal transport fluid means becomes locally more viscous.

16. The radiator system according to claim 15 wherein the thermal loop means further comprises distributing thermal transfer means for distributing the thermal loop means across the heat radiator means to increase thermal transfer from the thermal loop means to the heat radiator means.

17. The radiator system according to claim 15 wherein the fluid flow control means comprises a flow rate controller means configured to reduce the flow rate of the thermal transport fluid means in response to the decreased temperature of the thermal transport fluid means.

18. The radiator system according to claim 15 wherein the viscosity of the thermal transport fluid means is inversely related to the flow rate of the thermal transport fluid means through the thermal loop means.

19. The radiator system according to claim 15 wherein at least some of the thermal transport fluid means becomes stagnant proximate the thermal connection with the thermal loop means and the at least one heat radiator means.

20. The radiator system according to claim 19 wherein the fluid flow control means adjusts the flow rate of the thermal transport fluid means to maintain at least a minimum flow of the thermal transport fluid means through the at least one fluid flow path when the at least the some of the thermal transport fluid becomes stagnant.

21. The radiator system according to claim 15 wherein the thermal loop means traverses through at least one human-life-supporting enclosed environment.

22. The radiator system according to claim 15 wherein the thermal transport fluid means comprises perfluoropolyether.

* * * * *

UNITED STATES PATENT AND TRADEMARK OFFICE
CERTIFICATE OF CORRECTION

PATENT NO. : 9,109,843 B1  
APPLICATION NO. : 12/826625  
DATED : August 18, 2015  
INVENTOR(S) : Christine Schroeder Iacomini Page 1 of 1

It is certified that error appears in the above-identified patent and that said Letters Patent is hereby corrected as shown below:

In the specification

STATEMENT REGARDING FEDERALLY SPONSORED RESEARCH OR DEVELOPMENT:

1. In column 1, line 17, change "NNJO8JA51C" to --NNJ08JA51C--.

Signed and Sealed this  
Second Day of February, 2016

Michelle K. Lee  
*Director of the United States Patent and Trademark Office*